(No Model.)
E. R. BASSETT.
Calipers.
No. 242,582. Patented June 7, 1881.
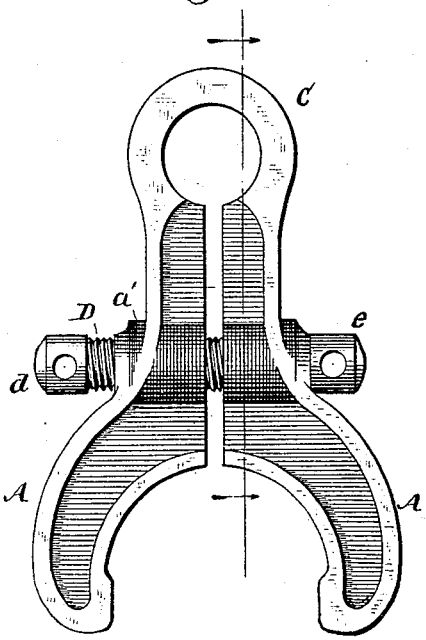
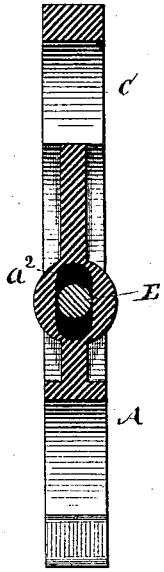
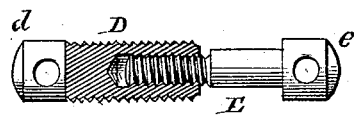
Witnesses:
A. M. Long.
W. B. F. Keyser
Inventor,
Ellery R. Bassett,
By Paine, Grafton & Ladd,
Attorneys.

UNITED STATES PATENT OFFICE.

ELLERY R. BASSETT, OF NEW BEDFORD, MASSACHUSETTS.

CALIPERS.

SPECIFICATION forming part of Letters Patent No. 242,582, dated June 7, 1881.

Application filed March 15, 1881. (No model.)

*To all whom it may concern:*

Be it known that I, ELLERY R. BASSETT, a citizen of the United States, residing at New Bedford, in the county of Bristol and State of Massachusetts, have invented certain new and useful Improvements in Caliper-Gages; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to that class of instruments which are used for measuring the diameter of convex or cylindrical bodies.

The object of the invention is to furnish more effective and reliable means than heretofore used for adjusting the legs or arms of a caliper-gage; and to this end the invention consists in the construction and combination of parts hereinafter described.

In the drawings, Figure 1 is a side elevation of a gage constructed according to my invention. Fig. 2 is a vertical section thereof, and Fig. 3 is a detail view of the two adjusting-screws.

The arms or legs A and the connecting top portion, C, of the gage are in the present instance constructed of a single piece of metal. The lower portions of the legs are curved or arched, so that they will fit on convex or cylindrical bodies in the manner of outside calipers. The legs are capable of being expanded and contracted, so as to widen or lessen the space between the same and adapt the gage for use on various-sized objects. This adjustment of the legs is effected by means of the two screws D and E. The screw D passes through a screw-socket, A', formed in one of the legs of the instrument, while the screw E passes through a slot, $A^2$, made in the other leg, in order that the screws may have the proper play to permit the legs to open and close. The screws are so arranged that the screw E enters an internally-threaded bore of the screw D, as is clearly shown in the drawings, the upper portion of the screw E, which passes the slot $A^2$, having no thread cut thereon. The screw D is made of a larger diameter than the screw E, and its external screw-thread runs in an opposite direction from its internal screw-thread and the thread cut on the screw E. The inner end of the screw D abuts against the adjoining leg of the gage when the parts are in a contracted or closed state, and its outer end is provided with a milled or apertured head, *d*, for the purpose of turning the same. The screw E also has a similar head, *e*, for a like object.

In order to expand or open the legs of the gage the two screws are turned in opposite directions, which will cause the screw D to wind outwardly through the socket in its supporting-leg, while the screw E will travel outwardly in the internal screw-thread of the screw D.

It will be manifest that the screw D serves to expand the legs of the gage, while the screw E acts as a device for locking the same and holding it firmly in any desired position.

For contracting or drawing the legs of the gage together the screw D is run out and the screw E screwed in until the legs of the gage register the desired distance.

A gage constructed as above described is more easily adjusted and held in various positions than the ordinary calipers or gages having a single transverse adjusting-screw.

The double screws used by me will also render possible a more precise adjustment of the parts than in the gages heretofore known.

I am aware that the sliding jaw of a nut-wrench has been operated by means of a screw-tube which is provided with external and internal screw-threads, engaging respectively with the screw-threaded shank of the stationary jaw and the internally-threaded socket of the movable jaw, so that by turning said screw-tube the sliding jaw will travel with the united volocities of the two screws.

Having thus described my invention, what I claim as new, and desire to secure by Letters Patent, is—

The caliper-gage herein described, comprising two adjustable legs provided respectively with a screw-threaded socket and a plain or smooth surfaced socket or opening, the externally and internally threaded hollow screw fitted in the screw-threaded socket, and the solid screw having a threaded portion entering the threaded hollow screw, and a plain portion fitting into the smooth-faced socket of the caliper-leg, as and for the purpose set forth.

In testimony whereof I affix my signature in presence of two witnesses.

ELLERY R. BASSETT.

Witnesses:
   CHARLES ALMY,
   WILLIAM A. BASSETT.